United States Patent [19]

Jahnke

[11] Patent Number: 4,547,145
[45] Date of Patent: Oct. 15, 1985

[54] COMBINATION WITH A HIGH TEMPERATURE COMBUSTION CHAMBER AND TOP BURNER

[75] Inventor: Frederick C. Jahnke, Rye, N.Y.

[73] Assignee: Texaco Development Corporation, White Plains, N.Y.

[21] Appl. No.: 473,470

[22] Filed: Mar. 9, 1983

[51] Int. Cl.$^4$ ............................................. F23D 5/12
[52] U.S. Cl. ......................................... 431/76; 431/79
[58] Field of Search ............................ 431/79, 13, 76

[56] References Cited

U.S. PATENT DOCUMENTS

| | | | |
|---|---|---|---|
| 2,295,045 | 9/1942 | Mettler | 431/79 X |
| 3,058,733 | 10/1962 | Steventon et al. | 431/79 X |
| 3,076,495 | 2/1963 | Ray et al. | 431/79 X |
| 3,105,150 | 9/1963 | Duke | 431/13 |
| 3,256,842 | 6/1966 | Vigneron et al. | 431/79 X |
| 3,368,753 | 2/1968 | Baumgartel et al. | 431/76 X |
| 3,486,835 | 12/1969 | Grobe | 431/79 |
| 3,825,397 | 7/1974 | Johansson et al. | 431/79 |
| 4,113,445 | 9/1978 | Gettert et al. | 431/6 X |
| 4,180,543 | 12/1979 | Ward | 422/188 X |
| 4,353,712 | 10/1982 | Marion et al. | 431/6 X |
| 4,445,444 | 5/1984 | Espedal | 431/4 X |

FOREIGN PATENT DOCUMENTS

| | | | |
|---|---|---|---|
| 7039 | 1/1977 | Japan | 431/79 |
| 80621 | 7/1981 | Japan | 431/79 |
| 82617 | 5/1982 | Japan | 431/79 |

*Primary Examiner*—James C. Yeung
*Attorney, Agent, or Firm*—Robert A. Kulason; Henry C. Dearborn

[57] ABSTRACT

In the combination of a high temperature combustion chamber which has a burner at the top, there is a radiant energy conduit that is associated with the burner so as to receive radiant energy from the interior of the combustion chamber. The burner introduces the constituents of a synthesis gas generation process. The radiant energy conduit is cooled by its association with the burner, and its purpose is for making temperature measurements inside the chamber.

3 Claims, 4 Drawing Figures

U.S. Patent  Oct. 15, 1985  Sheet 1 of 2  4,547,145
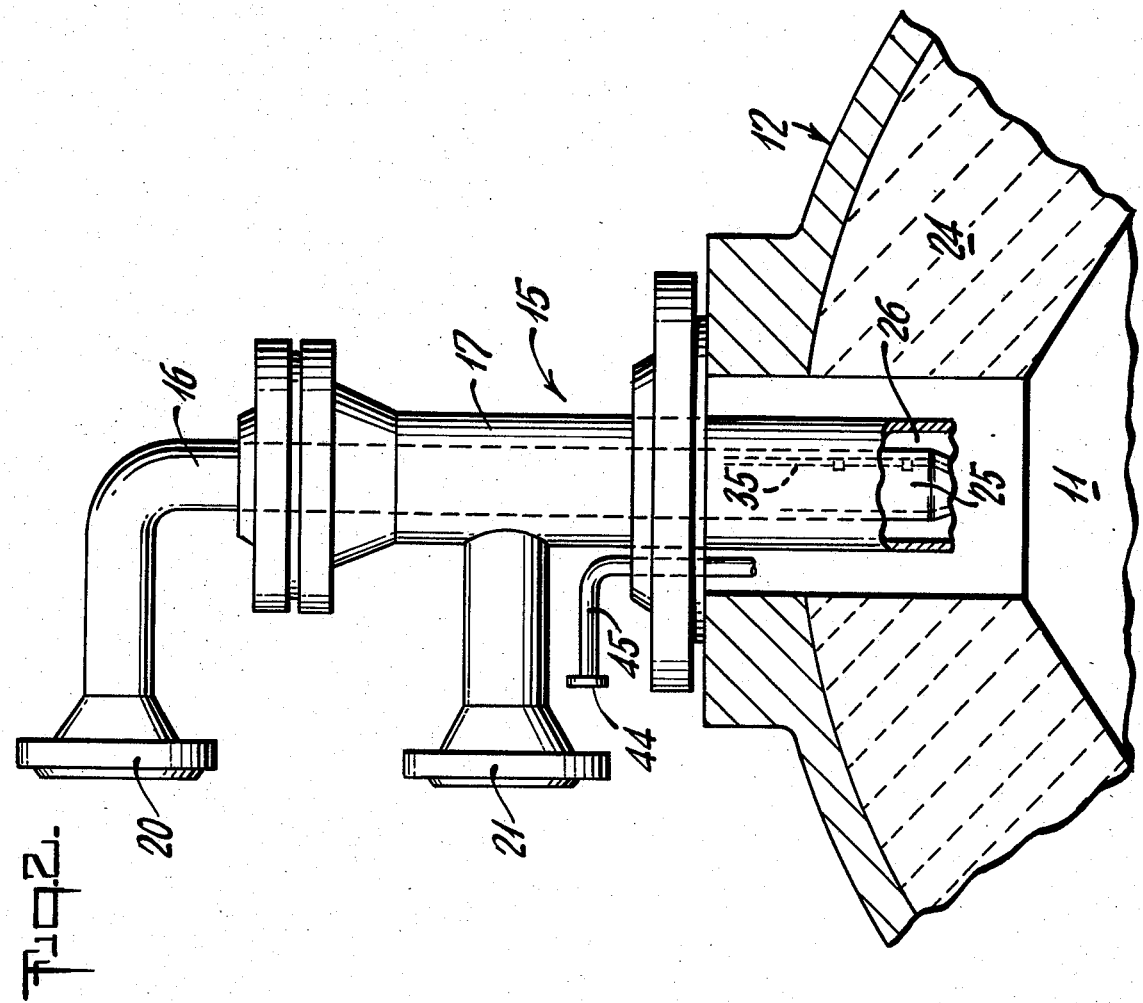
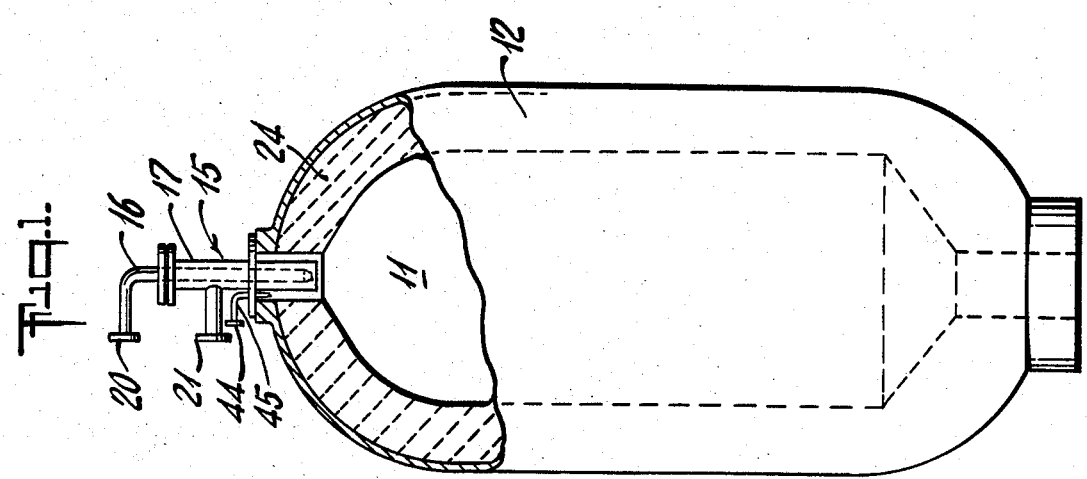

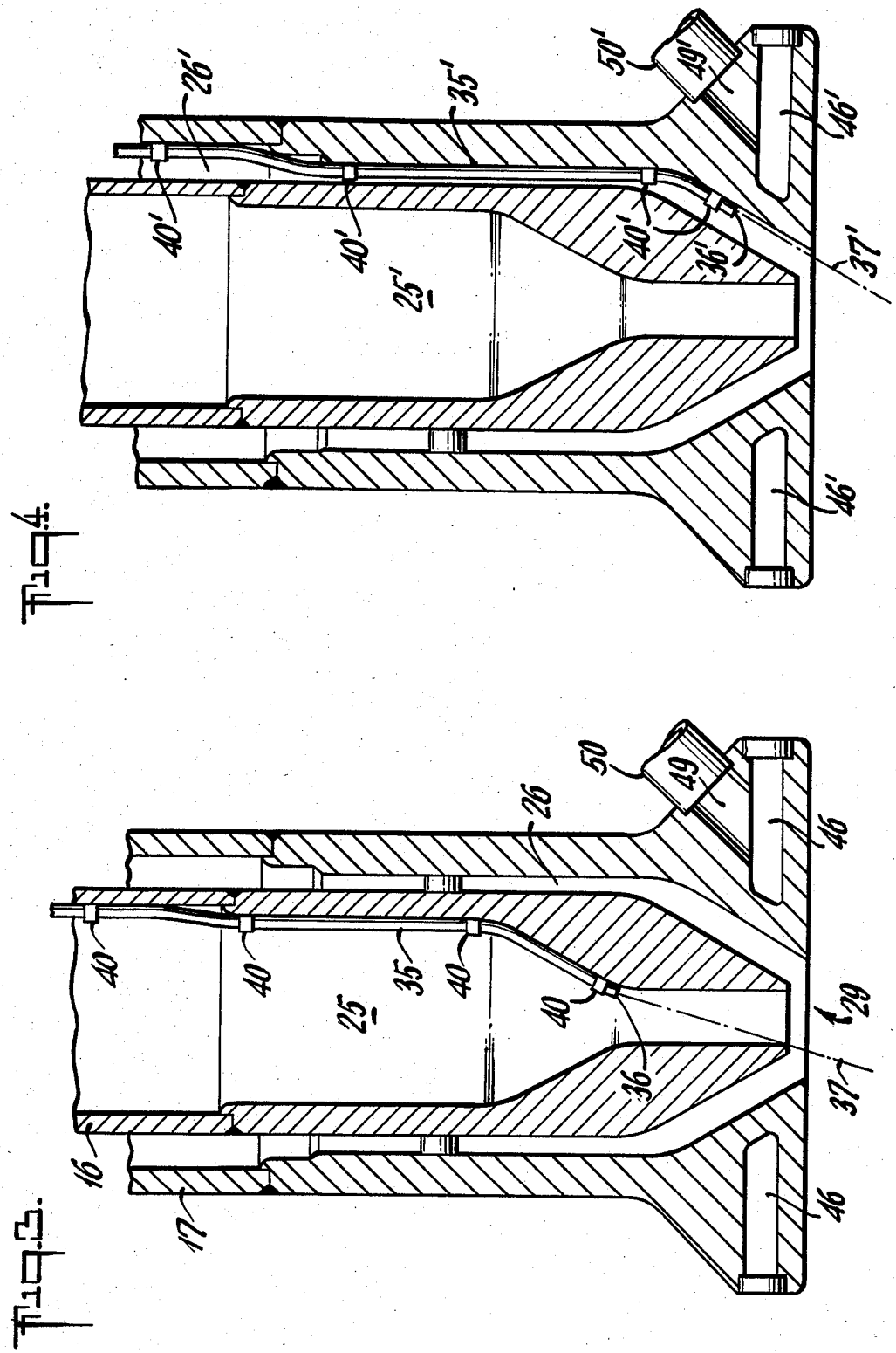

COMBINATION WITH A HIGH TEMPERATURE COMBUSTION CHAMBER AND TOP BURNER

FIELD OF THE INVENTION

This invention concerns a combination with a high temperature combustion chamber and a burner that introduces the constituents of a synthesis gas generation process. The combination relates to an improvement in measuring the temperature in the combustion chamber.

BACKGROUND OF THE INVENTION

In the past, in connection with a high temperature combustion chamber such as one used in a process of synthesis gas generation, measurement of the internal temperature within the chamber has been carried out using thermocouples inserted through the side of the vessel. However, because of the severe operating conditions encountered, the thermocouples have been subject to failure and a better way of measuring the internal temperature has been needed.

Some previous attempts to make use of an optical system, limited the view to the bottom hole in the chamber that led to the relatively cold quench area of the high temperature combustion chamber. Also in the past there have been arrangements for making a sighting into the interior of a high temperature combustion chamber so as to measure the radiation therein. But, such arrangements have required extensively well protected sight holes and even with the expensive equipment thus required there has been problems with the interior conditions that are being measured so that the results have not been satisfactory.

There is a U.S. Pat. No. 3,529,121 to S. N. Bobo et al, Sept. 15, 1970 which employs an optical fiber as a radiation conduit. It is incorporated in a welding rod. However, the operation of that arrangement includes the melting of the end of the optical fiber which is in contact with the weld. Therefore it is the melted temperature of the optical fiber itself which is being measured. Clearly, that would not be satisfactory for a high temperature combustion chamber measurement such as is involved in the subject application. Among other reasons, the optical fiber would soon be melted away and no longer effective.

Thus, it is an object of this invention to provide a radiant energy conduit that is associated with the burner of a high temperature combustion chamber in such manner that it may make a measurement of the interior temperature of the chamber without any harm to the optical radiant energy conduit.

BRIEF SUMMARY OF THE INVENTION

Briefly, the invention is in combination with a high temperature combustion chamber that has a burner at the top for introducing the constituents of a synthesis gas generation process. It includes a radiant energy conduit associated with the said burner, and it has an input end for directionally receiving radiant energy from the interior of said combustion chamber. The combination is for the purpose of measuring the temperature of a predetermined location in said combustion chamber.

Again briefly, the invention is in combination with a high temperature combustion chamber having a downwardly directed burner at the top for introducing the constituents of a synthesis gas generation process. The said burner has a plurality of coaxial feed stream conduits for carrying said constituents which end in a joint nozzle outlet. The combination includes an optical fiber having an input end for directionally receiving radiant energy from the interior of said combustion chamber. The said optical fiber is located inside the innermost of said coaxial conduits, and the said input end is directed toward the inside of a wall of said combustion chamber.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a schematic side elevation partly broken away in cross section illustrating a combustion chamber with a burner at the top according to the invention;

FIG. 2 is an enlarged schematic side elevation showing the burner elements and including a portion of the top of the combustion chamber shown in FIG. 1;

FIG. 3 is a further enlarged longitudinal cross section showing the burner tip elements and illustrating an optical conduit mounted in accordance with a preferred modification of the invention; and FIG. 4 is a showing like FIG. 3 but illustrating another modification of the invention.

DESCRIPTION OF THE PREFERRED EMBODIMENTS

Referring to FIGS. 1 and 2, there is illustrated a typical high temperature combustion chamber 11. And, it is the interior of a synthesis gas generator 12. There is a downwardly directed burner 15 at the top of the generator 12 which introduces the constituents of a synthesis gas generation process into the interior of the chamber 11. This burner 15 has two coaxial feed stream conduits 16 and 17 which have flanged inlet couplers 20 and 21 respectively. It will be appreciated that there might be more than two of these coaxial conduits in case it is desired to have more than two feed streams of the constituents for the synthesis gas generation process. Also, it may be noted that the generator 12 has a thick refractory lining 24, the interior surface of which forms the walls of high temperature chamber 11.

The coaxial conduits 16 and 17 form two coaxial passages 25 and 26 which merge at the outlet ends to form a joint nozzle outlet 29, see FIG. 3.

In the past, the measurement of interior temperature within a combustion chamber like the chamber 11 was carried out using one or more thermocouples (not shown) which were mounted through the interior lining, e.g. The wall 24 of the generator 12. Such thermocouples were subject to failure due to the severe conditions inside the chamber 11. However, use of a system according to this invention avoids that difficulty.

With reference to FIG. 3 there is an optical fiber 35 that has an input end 36. This end 36 is directed to receive radiant energy from the interior of the combustion chamber 11, and the path of such radiant energy is indicated by a dashed line 37 in the FIG. 3. The fiber 35 is attached in any feasible manner (such as by clips 40) to the inside surface of the inner feed stream passage 25 of the inner conduit 16. It will be understood that the output end (not shown) of the fiber 35 is connected to any feasible apparatus (not shown) for measuring the radiant energy that is transmitted through the fiber.

It may be noted that the burner 15 includes a cooling coil (not shown) which has an inlet end 44 and an outlet end at right angles (not shown). It carries cooling fluid, eg. water through a pipe 45 that is connected to the coil. And, the coil surrounds the burner 15. The coil connects with an annular passage 46 at the tip of the burner 15 surrounding the nozzle 29.

The coil is formed as a dual helix (not shown) and is connected to the passage 46 by short passageways, e.g. a passageway 49 to which an end 50 of one helix is connected.

A modification of the invention is illustrated in FIG. 4. The same elements as those shown in the FIG. 3 modification are indicated by the same reference numerals with prime marks added. In the FIG. 4 modification the optical fiber 35' is mounted inside the feed stream passage 26' using clips 40' to hold it in place. Thus the annular passage 26' is used for locating the optical fiber 35', instead of the inner feed stream passage 25'. However, as in the FIG. 3 modification the input end 36' of the optical fiber 35' is directed so as to receive radiant energy from the interior and at an angle so that it will measure conditions of the inside of lining 24 of the chamber 11. This is indicated by a dashed line 37'.

By making use of the arrangement of elements according to this invention the measurement of interior temperature is made reliable. Such temperature measurement is of importance in carrying out a procedure such as synthesis gas generation. The radiation measurement is made reliable and is feasible by reason of the location of the optical fiber. By being in one of the feed streams, it is kept at a temperature such that no damage will result thereto. The dimensions of the optical fiber according to this invention are sufficiently small so as to provide substantially no interference with the feed streams being introduced through the passages 25 and 26 in the burner 15.

While particular embodiments of the invention have been described above in accordance with the applicable statutes this is not to be taken as in any way limiting the invention but merely as being descriptive thereof.

I claim:

1. In combination, a high temperature combustion chamber being the interior of a synthesis gas generator having a thick refractory lining,
   a downwardly directed burner having two coaxial feed stream conduits at the top of said combustion chamber for introducing feed streams of the constituents of a synthesis gas generation process to be carried out in said synthesis gas generator,
   said feed stream conduits merging at the outlet ends to form a joint nozzle outlet, and
   means for transmitting radiant energy for measuring temperature of a predetermined location in said combustion chamber,
   said radiant energy transmitting means comprising an optical fiber attached to the inside surface of one of said feed stream conduits and having an input end for receiving radiant energy from the interior of said combustion chamber at an angle,
   means for directing said input end toward the inside of a wall of said combustion chamber so as to receive radiant energy from the interior and at an angle for measuring conditions on the inside of said thick refractory lining, and
   said optical fiber being located in the path of one of said feed streams inside of said burner.

2. The invention according to claim 1, wherein said optical fiber is located inside the innermost one of said coaxial feed stream conduits.

3. The invention according to claim 1, wherein said optical fiber is located in the annular passage of an outer one of said coaxial feed stream conduits.

* * * * *